UNITED STATES PATENT OFFICE.

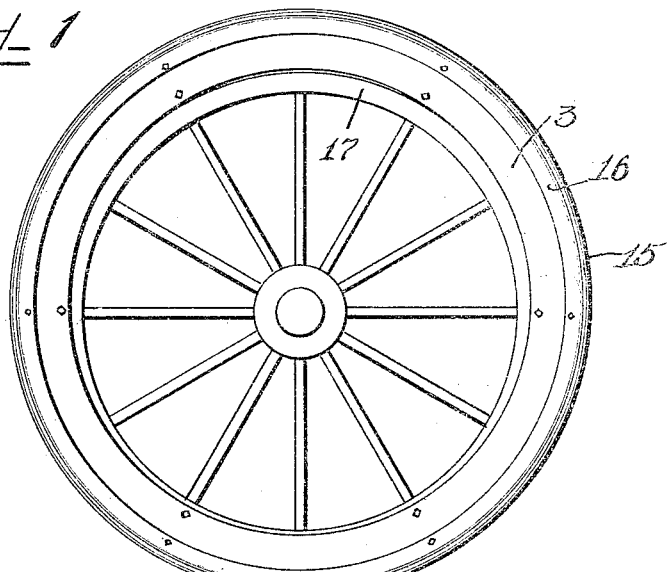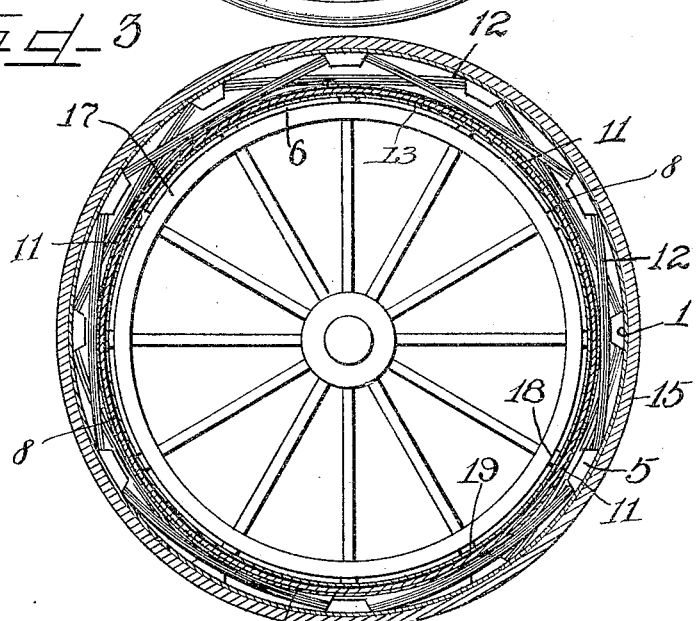

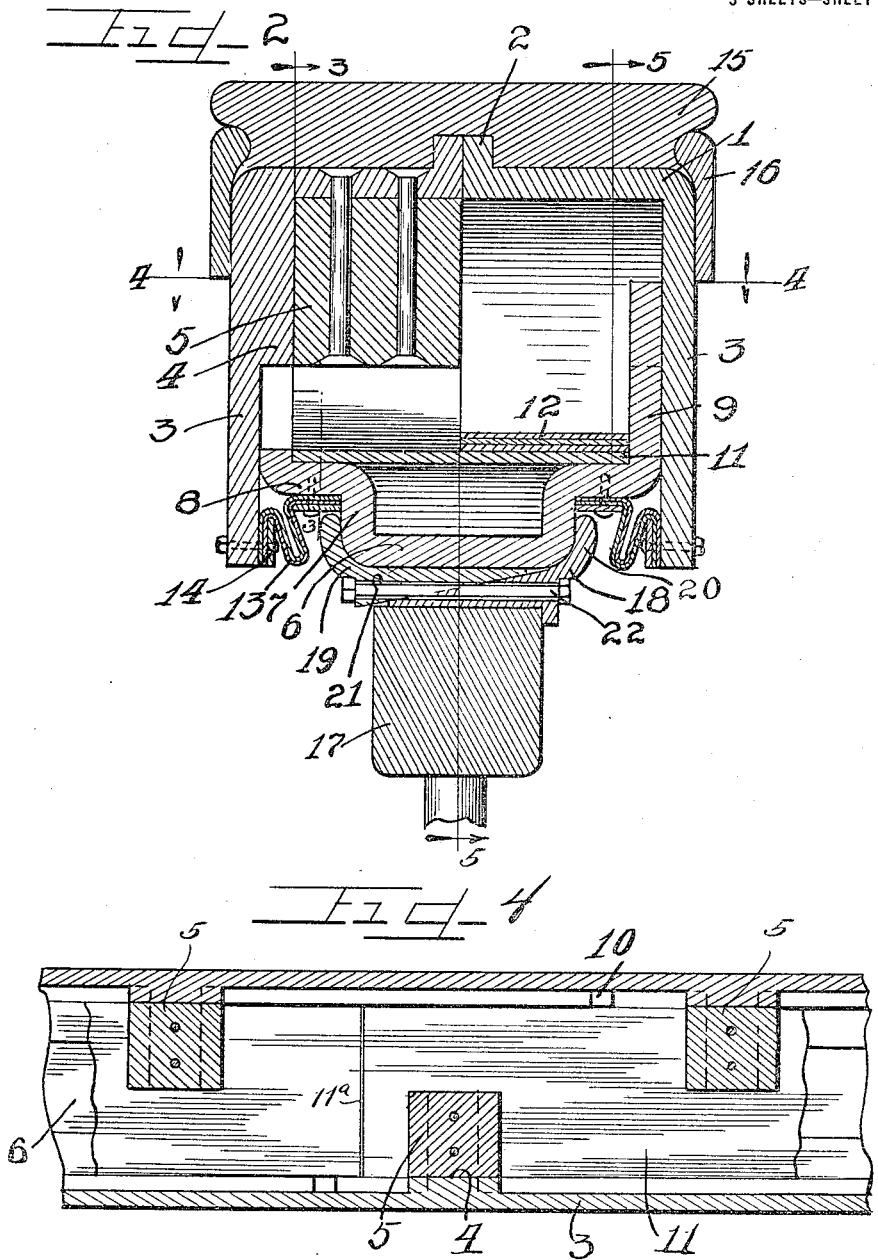

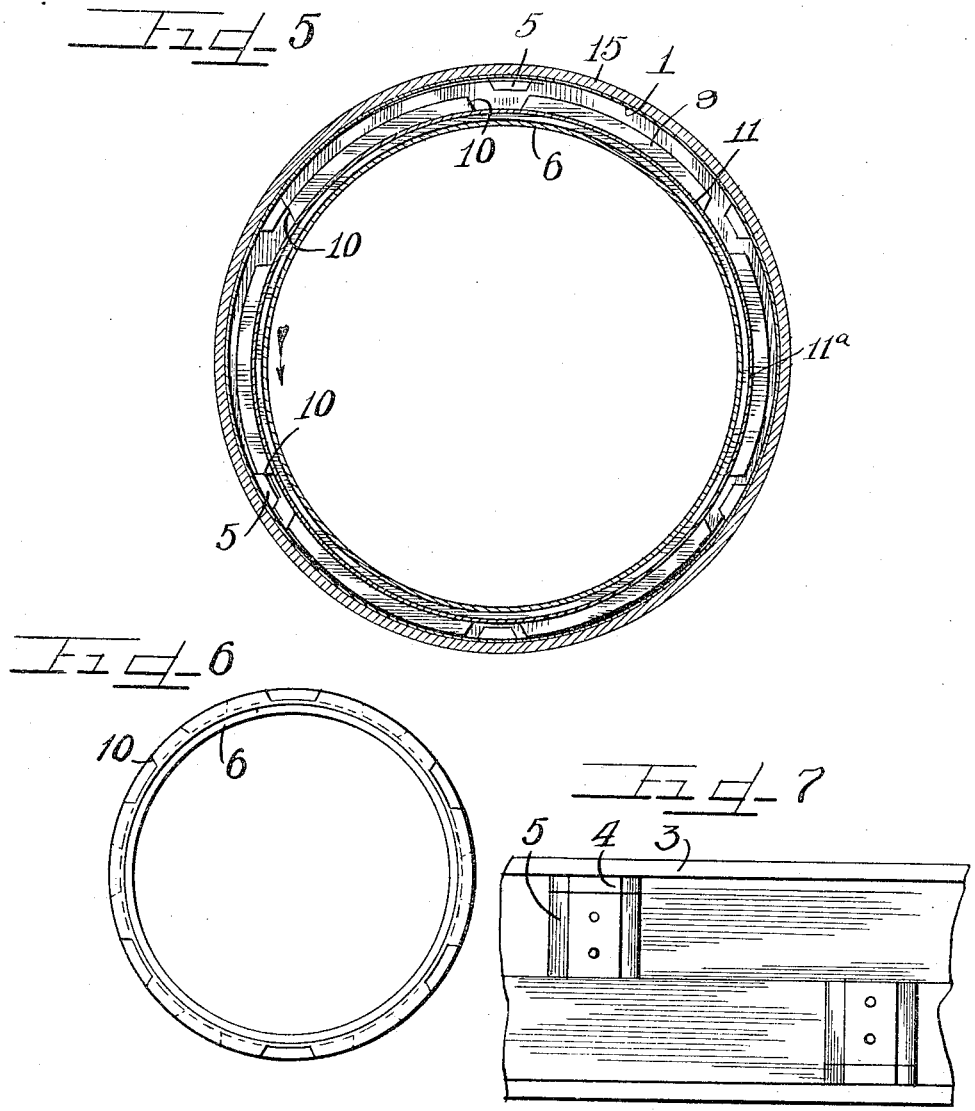

JAMES M. WAUGH, OF CHICAGO, ILLINOIS.

SHOCK-ABSORBING METALLIC TIRE FOR WHEELS.

1,210,740.  Specification of Letters Patent.  Patented Jan. 2, 1917.

Application filed November 14, 1912. Serial No. 731,359.

*To all whom it may concern:*

Be it known that I, JAMES M. WAUGH, a citizen of the United States, and a resident of the city of Chicago, in the county of Cook and State of Illinois, have invented certain new and useful Improvements in Shock-Absorbing Metallic Tires for Wheels; and I do hereby declare that the following is a full, clear, and exact description of the same, reference being had to the accompanying drawings and to the numbers of reference marked thereon, which form a part of this specification.

This invention relates to resilient wheels of that class set forth in my prior application for patent for "resilient wheels," filed on the 18th day of March, 1912, Serial No. 684,376, and wherein groups of flat spring plates, each group comprising a plurality of plates in frictional engagement face to face, are arranged between the outer rim and an intermediate rim to absorb shock and recoil, both through their resiliency and friction.

The object of this invention is to afford a metallic shock absorbing tire comprising an outer rim constructed of cast or pressed steel or other suitable material, comprising two like sections or members rigidly secured together, and affording an inwardly open channel adapted to receive the inner rim of like material loosely and movably therein, said inner rim affording an outwardly opening channel affording between the same and the outer rim a succession of staggered spring pockets and to afford complemental abutments in the channels afforded by the rim, at least one pair of which on each rim at all times engages to positively drive the outer rim from the inner.

It is a further object of the invention to greatly simplify the structure and to afford a relatively light, though exceedingly strong and durable wheel, in which great shock and recoil absorbing capacity is afforded both through the resiliency of the spring groups and the friction between the plates of the respective groups.

It is also an object of the invention to afford a structure in which the outwardly directed peripheral flanges of the inner rim are shaped to afford abutments to communicate the drive to the complementally arranged abutments integral with the flanges of the outer rim, and also to afford a positive convex support for the central portion of each group of spring plates on the inner rim, said groups engaging at their ends the stops rigidly secured in the outer rim.

Other objects of the invention will hereinafter more fully appear.

The invention (in a preferred form) is illustrated in the drawings, and hereinafter more fully described.

In the drawings: Figure 1 is a side elevation of a wheel embodying my invention. Fig. 2 is an enlarged, transverse section taken through the rim and resilient tire. Fig. 3 is a reduced section taken on line 3—3 of Fig. 2. Fig. 4 is a reduced fragmentary section taken on line 4—4 of Fig. 2, with the springs omitted. Fig. 5 is a reduced section taken on line 5—5 of Fig. 2, with the springs omitted. Fig. 6 is a reduced view in side elevation of the inner rim showing the same removed from the wheel and from the outer rim. Fig. 7 is an enlarged fragmentary interior view of the outer rim member.

As shown in the drawings: The outer rim comprises two annular sections, each comprising a peripheral tread portion 1, having at its inner edge a relatively low outwardly directed peripheral flange 2, which abuts against the corresponding flange of the other section when the rim is assembled and through which the sections of said outer rim are rigidly secured together by means of rivets or bolts.

Relatively broad, inwardly directed flanges 3, integral with the outer edge of each of the tread portions 1, are of substantially the width of the radial thickness of the metallic portion of the tire when completed, and integral with each of said flanges at the inner side thereof, and with the tread portion are relatively thin inwardly directed abutments 4, and riveted, bolted, or otherwise rigidly secured on the inner side of each of the tread portions and of a width to extend from the inner face of the integral abutment 4, substantially for the remaining width of said section are abutments 5.

The abutment or stop afforded by the abutments 4 and 5, are relatively short peripherally of said rim and taper inwardly at their opposite sides, as shown in Figs. 3 and 5, and are arranged equal distances apart on each of said outer rim sections, and are staggered on said rim sections so that the stops or abutments at one side of the outer rim are arranged intermediate the stops or abutments on the other side of the outer rim.

The inner rim denoted as a whole by the numeral 6 may be constructed as an annular rolled, pressed or cast steel channel, the edges of which are bent outwardly to afford a short outwardly directed flange 7, then laterally and parallel with the central portion to afford peripheral shoulders 8, with which the flanges 9, of the channel are integrally connected.

The channel afforded by the inner rim is of a width to fit somewhat closely between the flanges of the outer rim, as shown in Fig. 2, and the flanges 9, of said rim are of much less depth than those of the outer rim, affording a wide clearance between the periphery of said flanges and the tread portion of the outer rim. Each of said flanges 9, is of substantially the same thickness as the abutments or stops 4, integral with the flanges 3, of the outer rim, and are recessed or notched to afford inclined shoulders 10, inclined complementally with the stops afforded by the abutment 4, and stop 5. The notches in said flanges 9, whereby said shoulders are afforded, are relatively long as compared with the length of said abutments peripherally of the outer rim to permit of vertical movement of the inner rim within the outer, and are so disposed that at least one of the shoulders on the flanges of the inner rim is at all times in engagement with one of the abutments 5 on the outer rim to communicate the drive from the inner directly to the outer rim, such engagement occurring at the downward moving side of the wheel at about forty five degrees (45°) in advance of the contact surface of the wheel with the road, at which time one of the shoulders 10, at the opposite side of the wheel and at approximately the same distance from the road contact surface, is in proximity to the opposite face of one of said abutments to permit prompt engagement upon reverse driving as seen in Fig. 5.

A metallic band 11 split at 11ª, is sprung into the channel afforded by the inner rim to rest upon the flat faces afforded by the inner surfaces of the shoulders 8, and extends entirely around said channel, as shown in Figs. 2, 3, and 4. Arranged in each of said outer rim sections are groups of spring plates 12. Each of said groups comprises a plurality of flat spring plates laid one upon the other and inserted with their middle portions bearing upon and slightly sprung over the filler plate 11 and with their ends loosely engaged against the adjacent faces of the abutments and stops in the respective outer rim sections. Said plates constituting each group are not attached to each other or to any portion of the outer or inner rims, but are held in place by their mutual resiliency inasmuch as they are inserted in place under some tension, or, in other words, are slightly flexed over the filler 11, such flexing, however, not detracting from the resiliency of the wheel, inasmuch as the tension exerted thereby on the inner rim is balanced at all points on the inner rim by the tension of the other groups arranged between said rims.

As shown, a band of flexible waterproof material 13, is engaged at one edge by means of a clamping plate 14, at the inner edges of the respective flanges of the outer rim, and at their inner edges are engaged on the shoulders 8, of the inner rim to afford a waterproof joint whereby dust, dirt and moisture are excluded from entrance into the tire. If desired, a cushion rubber tire 15, may be engaged by means of clamping rings 16, or in any suitable manner on the tread of the outer rim, or any suitable tread may be applied on the outer periphery of the outer rim to afford a contact surface for the road, having better frictional bearing thereon than steel or other metal.

As shown in the drawings, the resilient shock absorbing tire is removably engaged upon the felly 17, of a wheel of ordinary or any suitable construction, by means of clamps comprising interfitting wedge members 18 and 19, each provided with an outwardly directed flange to extend outwardly over the flanges 7, of the inner rim, the clamping member 18, being provided with an inwardly directed flange 20, to bear against the outer side of the felly, each of said clamping members being apertured, the one to receive an internally threaded sleeve bolt 21, and the other a threaded bolt 22, to thread thereinto, and whereby the wedge faces of said clamping members are drawn firmly into engagement between the channel of the inner rim and the felly, as shown in Fig. 2. Of course, any desired number of said attaching clamps may be used, and arranged so that the clamping member 18, is used alternately on opposite sides of the felly thereby rigidly engaging the tire upon the felly of the wheel.

The operation is as follows: The wheel may, of course, be of any desired construction, and the metallic resilient tire when applied thereto, whether permanently or detachably, is used in lieu of the pneumatic tires or cushion tires heretofore employed, and acts to absorb the shock incident to inequalities in the road surface, in the resiliency of its springs by the friction occasioned by the flexing of the groups of springs on which the load is sustained. The friction due to the slight relative slip of one plate upon another in each group, is very great, as the friction surface is obviously the areas in engagement. In consequence, not only is the shock due to the inequalities of the road absorbed, but as well the recoil and rebound, thereby relieving the wheel and axle and the parts supported thereon, from the dangerous stresses occasioned thereby. Obviously, the groups of springs arranged in staggered relation between the channels, coact in absorbing such stresses, inasmuch as the weight is actually supported at all times upon all groups or parts of groups below a horizontal line drawn through the axle, while the groups of springs above such line assist frictionally and through their resiliency in resisting violent recoil or upward throw after each road shock. Upon reversing, the abutments and shoulders on the opposite side of the wheel from the driving shoulders and abutments at the forward side, are in position to promptly engage, thus a tendency to any slip of one wheel within the other is obviated.

Of course, the number and thickness of the plates in the groups of spring plates will vary with the service to be required, and if it is intended for carrying a light load, necessitating but few spring plates to a group and those relatively thin, while those intended for use on vehicles such as trucks or railway or street cars, will require more numerous plates and parts of greater thickness.

Numerous details of the construction may be varied. I therefore do not purpose limiting myself otherwise than necessitated by the prior art.

I claim as my invention:

1. A metallic resilient tire for wheels, embracing an annular rim affording an inwardly facing channel having substantially parallel deep flanges, said flanges forming the outer sides of said tire, abutments on the inner sides thereof and having oppositely inclined faces, an inner rim comprising a channel having outwardly directed flanges adapted to slidably fit within the flanges of the outer rim and notched to afford shoulders to engage the inclined faces of said abutments, said abutments and said shoulders being so disposed relatively each other that in driving at least one abutment shall engage one of said shoulders at a point in advance of and above the point of road contact, and groups of spring friction plates engaged at their ends against said abutments and bearing centrally on the inner channel and movable in said tire under tension.

2. In a device of the class described, an annular channel rim, relatively short and low abutments integral with the flanges thereof and having oppositely inclined faces, an outwardly opening inner channel rim slidably fitted in the outer channel rim and having the edges of its flanges notched to loosely engage the abutments therein, groups of thin spring plates arranged in staggered relation between the rims at opposite sides thereof, and a filler band in the inner rim upon which the central portion of each spring group bears.

3. In a device of the class described, an outer flanged rim member, an inner flanged rim member fitting therewithin, coöperative relatively movable members on said respective flanges to engage one another to transmit the drive therebetween, and groups of unconnected resilient friction members sprung into position in staggered relation within said outer rim member to receive the weight of said inner rim member thereon.

In testimony whereof I have hereunto subscribed my name in the presence of two subscribing witnesses.

JAMES M. WAUGH.

Witnesses:
 LAWRENCE REIBSTEIN,
 CHARLES W. HILLS, Jr.

Copies of this patent may be obtained for five cents each, by addressing the "Commissioner of Patents. Washington, D. C."